Nov. 26, 1957    F. J. FONTEIN ET AL    2,814,388
SCREENING DEVICE
Filed March 18, 1957    2 Sheets-Sheet 1
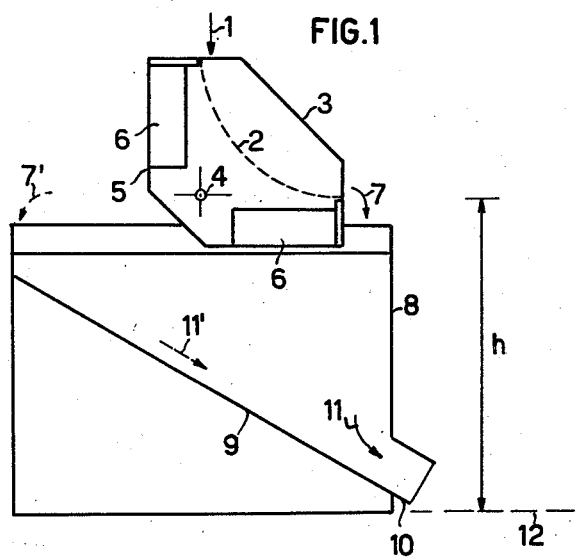
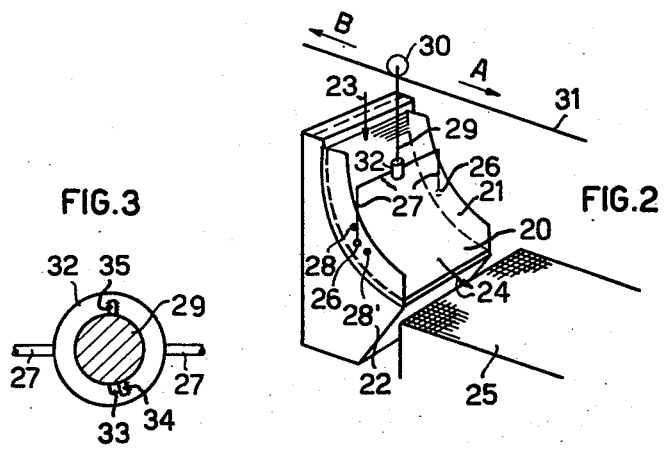

Nov. 26, 1957  F. J. FONTEIN ET AL  2,814,388
SCREENING DEVICE
Filed March 18, 1957  2 Sheets-Sheet 2
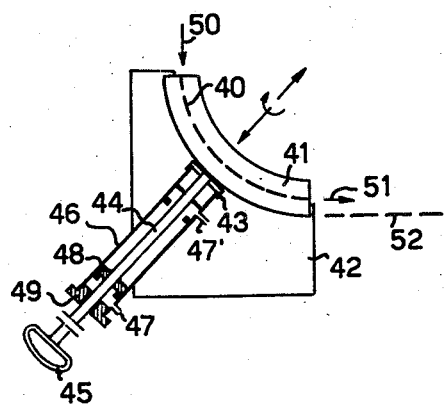
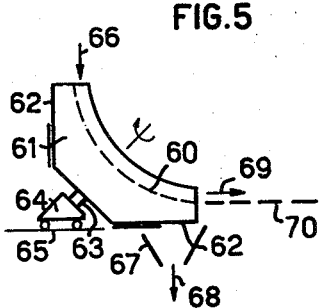
Inventors
Freerk J. Fontein
Hubert H. Driessen
By Cushman, Darby & Cushman
Attorneys

United States Patent Office 2,814,388
Patented Nov. 26, 1957

2,814,388

SCREENING DEVICE

Freerk J. Fontein, Heerlen, and Hubert H. Dreissen, Hoensbroek, Netherlands, assignors to Stamicarbon N. V., Heerlen, Netherlands Application March 18, 1957, Serial No. 646,826

13 Claims. (Cl. 209—251)

This invention relates to particle separation and more particularly to improvements in apparatus for separating particles differing in size suspended in a liquid.

In Fontein, application Serial No. 475,251, filed December 14, 1954, a screening device is disclosed which includes a screen deck in the form of a cylindrically bent surface, means for tangentially feeding a suspension of particles to be separated over the full width and to the concave side of the screen deck, and means for collecting the separated fractions, the design being such that either end of the screen deck may be used as the feed end.

This arrangement is particularly applicable to a cylindrically bent bar screen, where the bars are placed parallel to the generatrices of the screen deck, and a deterioration of the sharpness of separation due to uneven wear of the bars may occur. That is, by alternatively utilizing the opposite ends of the deck as the feed end, wear is more evenly distributed and a sharp separation is maintained. The screen deck may be fitted in a frame resting on supports provided in the collecting device for the undersize or the fine fraction of the material to be screened. Changing the position of the screen deck, i. e. making the feed end the discharge end and the discharge end the feed end, can be done by lifting the frame with attached screen deck from the collecting device and reversing it. In doing so, care should be taken to replace the screen deck in the correct position. If the screening device has been designed for grading large quantities of material per unit of time, the screen deck will have a relatively large surface area. The deck will then be heavy and difficult to handle, so that damage may occur during handling. Further, there is not always sufficient room available for enabling the screen deck to be reversed with the necessary care and accuracy.

In Fontein and Basten, Patent No. 2,748,941, issued June 5, 1956, it has been proposed to fit the screen deck in a revolving pivoted casing in such a way, that in one position, one end of the screen deck joins the feed means and in the other position the opposite end joins the feed means. The casing is then revolving pivoted on fixed horizontal trunnions.

With this construction the oversize from the screen deck containing the coarse fraction is collected in a hopper fitted beneath the screen deck, which hopper may consist of an inclined chute, as shown schematically in Figure 1. If the coarse fraction is to be subjected to further processing, a certain loss in the height or potential energy of the fraction necessarily results. However, this is often objectionable due to the necessity of utilizing this potential energy as when the subsequent process is to take place at substantially the same level as the discharge end of the curved screen deck.

The object of the present invention is to eliminate these drawbacks and to provide a screening device which is easy to handle and can be accurately placed in its reversed position, while the screen deck has its discharge end for the coarse fraction located at a level substantially corresponding with that of a subsequent processing device.

A further object of the present invention is the provision of a device of the type described having improved means operable to support the screen deck for movement out of an operative position and back into the operative position in end for end reversed relation so that the end formerly serving as a discharge end receives the fed suspension and the end formerly serving as a feed end discharges the oversize fraction.

These and other objects of the present invention will become more apparent during the course of the following detailed description and appended claims.

The invention can best be understood with reference to the accompanying drawings wherein illustrative embodiments are shown.

In the drawings:

Figure 1 is a schematic side elevational view of a known device;

Figure 2 is a perspective view illustrating one form of a device embodying the principles of the present invention;

Figure 3 is a fragmentary cross-sectional view illustrating certain details of construction of the device of Figure 2;

Figure 4 is a schematic side elevational view illustrating another form of a device embodying the principles of the present invention; and Figure 5 is a view similar to Figure 4 illustrating still another form of a device embodying the principles of the present invention.

Referring now to the drawings, there is shown in Figure 1 a screening device similar to the one disclosed in the aforesaid patent in which the material to be screened, consisting of a mixture of solid particles of different grain size suspended in a liquid, is fed tangentially at 1, as a thin layer to the concave side of a screen desk 2, which consists of a cylindrically bent screening surface. Preferably, the screening surface consists of a bar screen, the bars of which are placed perpendicular to the direction of flow of the liquid. Stated differently, the bars are disposed parallel to the generatrices of the screen deck. However, screen decks of other designs may also be used, if desired. The screen deck 2 is fitted in a frame 3, the sides of which are provided with trunnions 4, allowing the frame with the screen deck to be pivoted through an angle of approximately 90° about a horizontal axis coincident with the trunnions. The frame is closed by a bottom 5 and ports 6 are provided in the sides of the frame for lateral discharge of the undersize fraction or fines passing through the screen. With the screen deck in the operating position shown, the coarse or oversize fraction retained on the screen deck leaves the screen at 7, and in the other operating position the discharge will be at the position indicated at 7'. The oversize fraction is collected in a collecting devices 8 having an inclined bottom 9 and a discharge opening 10. It will be seen that with the screen deck in the operating position shown, the coarse fraction is discharged in the direction indicated by the arrow 11 and in the other operating position the discharge will be in the direction indicated by the arrow 11'. Disposed adjacent the discharge opening 10 is a suitable device for further processing the coarse fraction, as, for example, a flat screen 12. It will be noted that the inclined position of the bottom plate 9 creates a difference in height $h$ between the discharge end of the concave screen deck and the flat screen. It is this difference in height which the present invention has been developed to overcome.

Referring now to Figures 2 and 3 of the drawings, there is shown therein a device embodying the principles of the present invention which includes a cylindrically bent screen deck 20 mounted in a frame 21. Any suitable means such as fixed lugs (not shown) or the like are provided for removably positioning the frame in a collecting device 22 for receiving the fine fraction. The material to be screened, in the form of liquid suspended particles of varying size, is fed by any suitable means tangentially, as indicated at 23, as a thin layer to the concave side of the deck 20 at one end thereof. The coarse fraction leaves the other end of the deck at 24 and is collected on a flat screen 25, the top surface of which lies a short distance below the discharge end of the curved screen deck. The frame 21 is pivoted to a yoke 27 by means of trunnions 26 placed in the bisector of the arc of the screen deck. Lugs 28 and 28' are mounted on the frame on opposite sides of the trunnions for limiting the angle of rotation of the screen deck in either direction. In the position shown, the vertical legs of the yoke 27 rest against the lugs 28, while after the frame has been turned through an angle of 180° about a vertical axis and the screen deck has been turned about the axis through the trunnions 26, so that the discharge end of the screen deck has taken the place of the feed end, the legs of the yoke rest against the lugs 28'. The mid-portion of the yoke 27 is rotatably secured to the lower end of a vertical rod 29, the upper end of which is attached to a carriage 30 mounted for forward and backward movement on a rail 31.

The seams for rotatably securing the yoke 27 to the rod 29 is shown in detail in Figure 3, and includes a collar or bushing 32 secured to the yoke and rotatably receiving the rod 29 which is suspended thereon by any suitable means, such as a shoulder or nut (not shown) disposed under the bushing 32. The rod 29 carries two abutments or stops 34 and 35, which alternatively engage a cooperating lug 33 on the bushing 32, so as to limit rotation of the bushing through an angle of 180°, the extremes of the limits defining the two operative positions of the deck.

To reverse the screen deck, the whole assembly is shifted in direction A until the deck is sufficiently clear of the collecting device 22. The bottom of the frame 21 should remain clear of the top surface of the flat screen 25. Next, the screen deck may be turned around the trunnions 26 until the lug 28' strikes against the vertical leg of the yoke 27 after which the frame is turned 180° about the rod 29. Finally, the screen deck is shifted back into its original operating position with the feed and discharge ends of the screen deck thus having changed places. The screen may, of course, also be rotated first about the rod 29 and then swung about the trunnions 26. Another possibility is to use a fixed connection between the rod 29 and the yoke 27 and connect the bushing 32 to the carriage 30.

In the embodiment shown in Figure 4, a curved screen deck 40 is mounted in a frame 41 which rests on suitable supports (not shown) provided on a collecting device 42 for the fine fraction. Disposed in the center of the arc of the frame 41 is a channel iron or bushing 43 carrying a round bar, shaft, or rod 44, the axis of which lies in a plane perpendicular to the generatrices of the screen deck and coincides with the bisector of the arc of frame 41. The rod 44 is provided, at the end thereof remote from the channel 43, with a handle 45 and may be rotated and moved thereby in axial direction within a cylindrical bushing or cylinder 46 rigidly fixed in the collecting device 42. The one end of the bushing 46 preferably extends within the flanges of the channel iron or the bushing 43 so as to prevent particles of the fine fraction or water from entering between the rod 44 and the bushing 46. In the case of a large, and consequently heavy, screen deck, the rod 44 may be moved in axial direction within the bushing 46 by fluid pressure means. The bushing 46 is then closed at its ends and provided with connections 47 and 47' leading to a source of fluid under pressure. A piston 48 is fixed to the rod 44 and slidably mounted within the bushing which is sealed at its bottom by a stuffing box 49.

To reverse the screen deck, a fluid under pressure is admitted through the connection 47, which fluid is discharged at 47', so that the rod 44, with frame 41 and screen deck 40 are forced upwards thus coming clear of the walls of the collecting device 42 and into an inoperative position. In this latter position the frame 41 is manually turned by handle 45 through an angle of 180°. Finally, the frame and deck are moved back into an operative position reversed end for end, by admitting fluid under pressure through connection 47' and discharging fluid through connection 47.

Here again, the rod 44 and the bushing 46 may be provided with lugs or stops to limit the rotary movement of the frame. With this construction it has to be borne in mind that the plate or other means enabling the material to be fed in tangential direction to the concave side of the screen must not interfere with the movement of the screen deck. The material is fed tangentially to the concave side of the screen deck by such means as indicated at 50. The coarse fraction leaves the screen deck at 51 and may discharge directly on to a flat screen 52.

In the embodiment graphically illustrated in Figure 5, a curved screen deck 60 is rigidly mounted in a collecting device 61 provided with discharge openings 62 for the fine fraction. The collecting device is mounted on a shaft 63 coinciding with the bisector of the arc of the screen deck 60 and lying in a vertical plane perpendicular to the generatrices of the screen deck. The shaft 63 is adapted to rotate in a bushing 64, which in its turn can be rolled along a surface 65 which in the drawing has been represented as extending in horizontal direction. The material is fed tangentially at 66 to the concave side of the screen deck. The fine fraction leaves the collecting device 61 through the lower opening 62 and is collected in a hopper 67 and discharged at 68. The coarse fraction leaves the screen deck at 69 and flows on to a flat screen 70.

To reverse the screen deck 60, the collecting device 61 and the deck 60 are moved out of the operative position shown into an inoperative position by means of the bushing 64 rolling on surface 65. In the inoperative position, the device 61 and screen deck 60 are rotated 180° by movement of the shaft 63 in bushing 64. Finally, the assembly is moved back into its operative position with the ends in reverse position and the opposite opening 62 discharging into the hopper 67.

In all of the embodiments of the present invention, the screen deck is preferably constructed in the manner set forth in the aforesaid Fontein application which is hereby incorporated by reference into this disclosure. While the feeding means of all embodiments are schematically illustrated, it will be understood that any of the exemplary constructions disclosed in the aforesaid Fontein application may be utilized. Significantly, the feeding means employed must be disposed to perform its feeding function and, in addition, to permit movement of the screen deck between its operative position and inoperative position so that reversal can be effected.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. A screening device, comprising a screen deck having the shape of a cylindrically bent surface disposed in an operative position to receive at one end a suspension of particles fed from a fixed feeding position tangentially to the concave side thereof and to discharge at its opposite end an oversize fraction into a fixed discharging position, and means operatively connected with said screening deck for moving the latter from said operative position into an inoperative position and returning it to said operative position reversed end for end so that said opposite end receives the suspension fed from said fixed feeding position and said one end discharges the oversize fraction into said fixed discharging position.

2. A screening device as defined in claim 1 wherein said means comprises a yoke pivotally carried by said screen deck for movement in a plane perpendicular to the generatrices of the screen deck, an overhead carriage, a vertical rod and bushing connecting said carriage to said yoke for pivotal movement about a vertical axis, and a rail supporting said carriage for linear movement so that said screen deck can be moved between said operative or inoperative positions by the translational movement of said carriage on said rail and reversed end for end by movement of said yoke about said vertical axis and said screen deck about its connection with said yoke.

3. A screening device as defined in claim 1 wherein said means comprises a shaft connected with said screen deck and having its axis disposed in the vertical plane of symmetry of the screen deck and coinciding with the bisector of the arc of the screen deck, and means supporting said shaft for rotary and longitudinal movement so that said screen deck can be moved between said operative and inoperative positions by longitudinal movement of said shaft and reversed end for end by rotary movement thereof.

4. A screening device as defined in claim 3 wherein said shaft supporting means comprises a cylinder and wherein a piston is rigidly secured to said shaft and slidably mounted within said cylinder for movement by fluid under pressure introduced into said cylinder.

5. A screening device as defined in claim 1 wherein said means comprises a shaft connected with said screen deck and having its axis disposed in the vertical plane of symmetry of the screen deck and coinciding with the bisector of the arc of the screen deck and a bushing rotatably receiving said shaft supported for linear movement so that said screen deck can be moved between said operative and inoperative positions by the translational movement of said bushing and reversed end for end by rotation of said shaft within said bushing.

6. A screening device as defined in claim 1 wherein said means comprises means for effecting linear movement of said screen between said operative position and said inoperative position and means for effecting an end for end reversal of said screen deck while in said inoperative position.

7. A screening device as defined in claim 6 wherein said end for end reversal effecting means includes stop means for limiting the end for end reversal between two extreme positions.

8. A screening device as defined in claim 1 wherein said screen deck in said operative position has a collection frame disposed adjacent its convex surface for receiving the undersize fraction passing therethrough.

9. A screening device as defined in claim 8 wherein said screen deck in said operative position is supported by said collection frame and is movable toward and away from the latter by the operation of said means.

10. A screening device as defined in claim 8 wherein said screen deck is rigid with said collection frame and the latter is moved with said screen deck by the operation of said means.

11. A screening device as defined in claim 1 wherein a second screening device is disposed in said fixed discharge position so as to receive the oversize fraction discharging from said screen deck.

12. A screening device comprising a screen deck disposed in an operative position to receive at one end a suspension of particles fed from a fixed feeding position to one side thereof and to discharge at its opposite end an oversize fraction into a fixed discharging position, means disposed adjacent the other side of said screen deck for collecting an undersize fraction passing through the screen deck, and means supporting said screen deck for movement out of said operative position and back into said operative position in end for end reversed relation so that said opposite end receives the suspension fed from said fixed feeding position and said one end discharges the oversize fraction into said fixed discharge position.

13. A screening device as defined in claim 12 wherein a second screening device is disposed in said fixed discharging position so as to receive the oversize fraction discharging from said screen deck.

References Cited in the file of this patent

UNITED STATES PATENTS

| | | |
|---|---|---|
| 1,185,595 | Daly | May 30, 1916 |
| 2,748,941 | Fontein et al. | June 5, 1956 |